(12) United States Patent
Chang et al.

(10) Patent No.: US 7,826,107 B2
(45) Date of Patent: Nov. 2, 2010

(54) SCANNING DEVICE WITH A FASTENING UNIT FOR FASTENING A SENSING UNIT TO A SCANNER BODY

(75) Inventors: Heng-Hsiang Chang, Taichung (TW); Hsien-Chi Lin, Taichung (TW)

(73) Assignee: Asia Optical Co., Inc., Taichung (TW)

( * ) Notice: Subject to any disclaimer, the term of this patent is extended or adjusted under 35 U.S.C. 154(b) by 839 days.

(21) Appl. No.: 11/803,832

(22) Filed: May 16, 2007

(65) Prior Publication Data
US 2008/0002238 A1    Jan. 3, 2008

(30) Foreign Application Priority Data
Jun. 29, 2006    (TW) ................................ 95123652 A (51) Int. Cl.
*H04N 1/04* (2006.01)

(52) U.S. Cl. ...................... 358/474; 358/497; 358/496; 358/483

(58) Field of Classification Search ............... 358/474, 358/497, 496, 483; 399/380
See application file for complete search history.

(56) References Cited

U.S. PATENT DOCUMENTS

| 6,363,576 | B1 * | 4/2002 | Hsu et al. ...................... 16/239 |
| 2005/0042006 | A1 * | 2/2005 | Qian et al. ................... 399/380 |

\* cited by examiner

*Primary Examiner*—Houshang Safaipour
(74) *Attorney, Agent, or Firm*—Trop, Pruner & Hu, P.C.

(57) ABSTRACT

A scanning device includes a scanner body, a scanning unit, a lens unit, a sensing unit, and a fastening unit. The scanner body has a bottom surface that is formed with two slots. The fastening unit includes two first fastening members disposed respectively within the slots, and two second fastening members engaging respectively and threadably the first fastening members so as to fasten the sensing unit to the scanner body.

6 Claims, 7 Drawing Sheets

SCANNING DEVICE WITH A FASTENING UNIT FOR FASTENING A SENSING UNIT TO A SCANNER BODY

CROSS-REFERENCE TO RELATED APPLICATION

This application claims priority of Taiwanese Application No. 095123652, filed on Jun. 29, 2006.

BACKGROUND OF THE INVENTION

1. Field of the Invention

This invention relates to an office machine, and more particularly to a scanning device that includes a fastening unit for fastening a sensing unit to a scanner body.

2. Description of the Related Art

Figure 1:
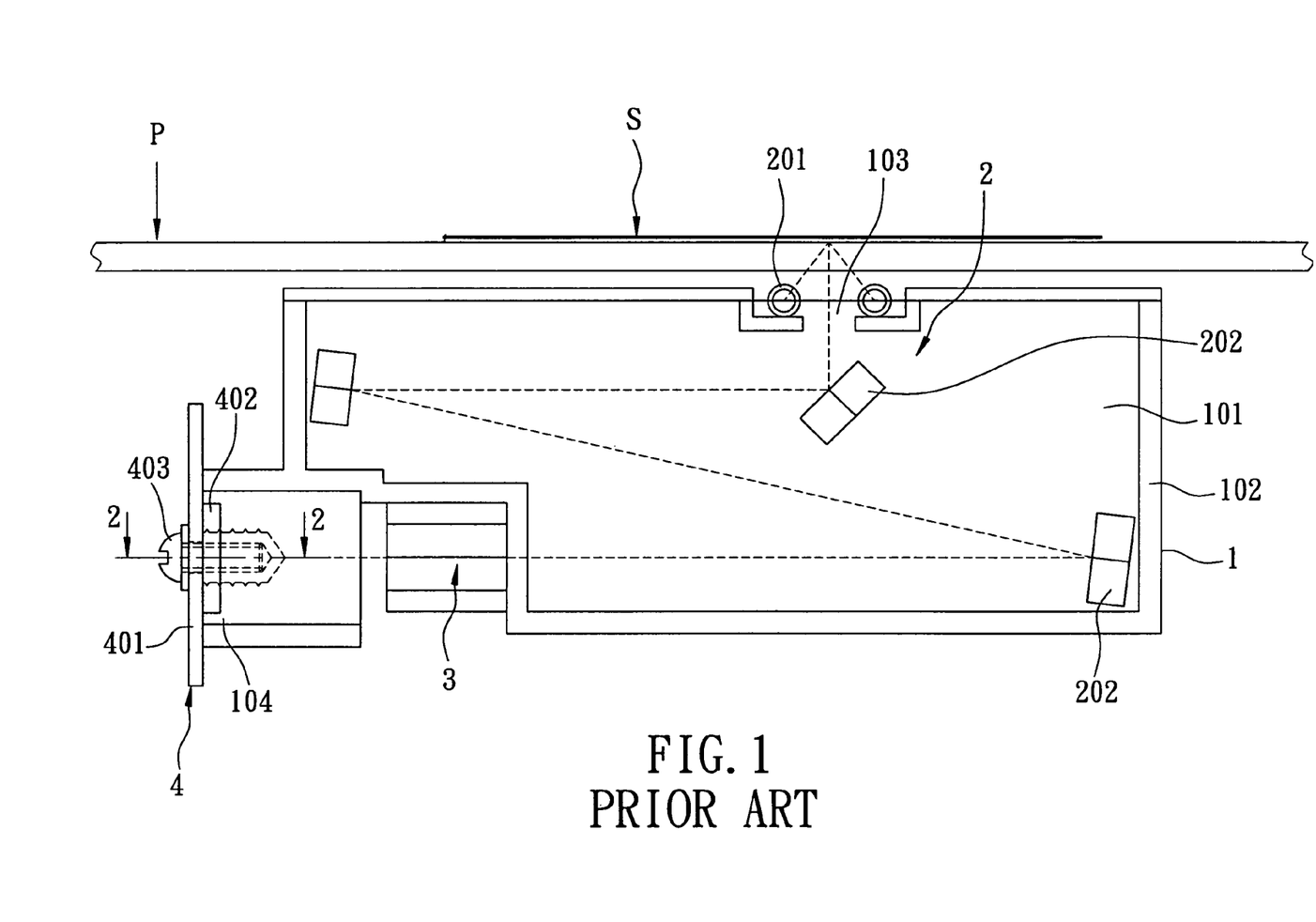
FIG. 1 is a schematic view of a conventional scanning device.
Figure 2:
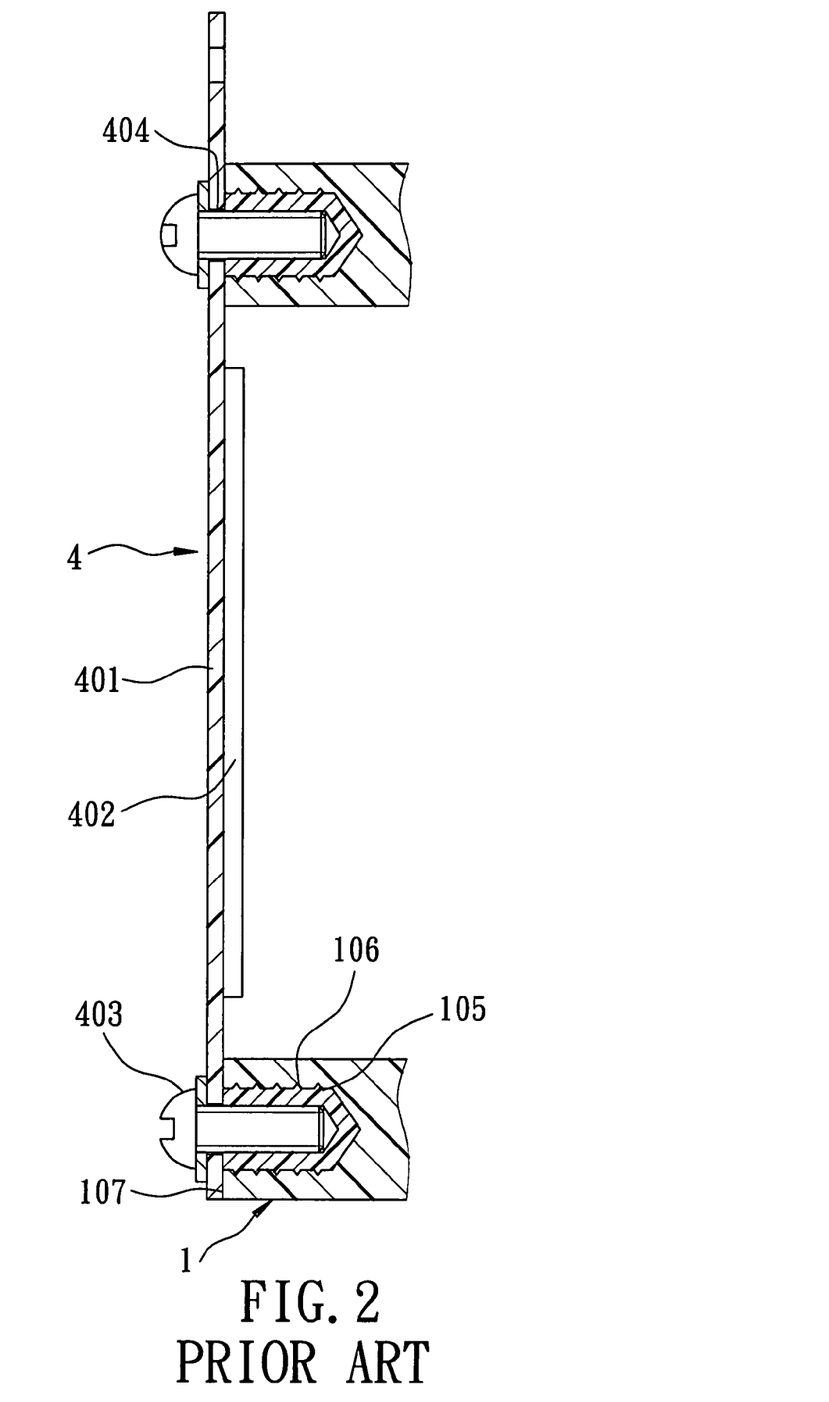
FIG. 2 is a sectional view taken along Line 2-2 in FIG. 1.

Referring to FIGS. 1 and 2, a conventional scanning device includes a scanner body 1, a scanning unit 2 disposed in the scanner body 1, a lens unit 3 disposed in the body 1, and a sensing unit 4 aligned with the lens unit 3. The scanner body 1 has a housing wall 102 defining a space 101. The housing wall 102 has a first opening 103 formed in a top portion thereof, and a second opening 104 formed in a lateral side thereof. The scanning unit 2 includes two light-emitting members 201 disposed in the first opening 103, and a plurality of reflectors 202 disposed in the space 101 for reflecting light beams emitted from the light-emitting members 201. The lens unit 3 is disposed in the second opening 104 for receiving reflected light beams from the reflectors 202. The sensing unit 4 includes a circuit board 401 attached to the scanner body 1 for covering the second opening 104, and a sensor 402 disposed fixedly on the circuit board 401. The sensor 402 may be a charge coupled device (CCD) image sensor or a complimentary oxide semiconductor (CMOS) image sensor for receiving an optical signal from the lens unit 3 and outputting a corresponding analog signal.

When light beams are emitted from the light-emitting members 201 onto an object (S) to be scanned, which is placed on a sheet of glass (P), reflected light beams are guided onto the lens unit 3 by the reflectors 202. Hence, the sensor 402 receives optical signals from the lens unit 3 to thereby output analog signals corresponding to the optical signals.

To assemble the sensor 402 onto the scanner body 1, a plurality of internal thread members 105 are pre-embedded into the scanner body 1. An outer surface of each of the internal thread members 105 has an anchoring portion 106. A plurality of bolts 403 extend respectively through holes 404 in the circuit board 401, and engage respectively the internal thread members 105. As such, the sensing unit 4 is fastened to the scanner body 1.

The aforesaid conventional scanning device suffers from the following advantages:

(1) When a distal end of any of the internal thread members 105 projects from an outer surface 107 of the scanner body 1, or when a threaded hole in any of the internal thread members 105 is deflected from the corresponding hole 404 in the circuit board 401, the circuit board 401 may be displaced slightly from its originally intended position such that the sensor 402 may be unable to receive fully the optical signals from the lens unit 3. This affects adversely the scanning effect of the scanning device.

(2) When the internal thread members 105 are assembled onto the scanner body 1, improper operation may result in damage to the anchoring portions 106. As such, the internal thread members 105 need to be replaced. However, such replacement is difficult, time-consuming, and expensive.

SUMMARY OF THE INVENTION

The object of this invention is to provide a scanning device that includes an improved fastening unit, which can overcome the above-mentioned disadvantages associated with the prior art.

According to this invention, a scanning device includes a scanner body, a scanning unit; a lens unit, a sensing unit, and a fastening unit. The scanner body has a bottom surface that is formed with two slots. The fastening unit includes two first fastening members disposed respectively within the slots, and two second fastening members engaging respectively and threadably the first fastening members so as to fasten the sensing unit to the scanner body.

BRIEF DESCRIPTION OF THE DRAWINGS

These and other features and advantages of this invention will become apparent in the following detailed description of the preferred embodiments of this invention, with reference to the accompanying drawings, in which.

DETAILED DESCRIPTION OF THE PREFERRED EMBODIMENTS

Before the present invention is described in greater detail in connection with the preferred embodiments, it should be noted that similar elements and structures are designated by like reference numerals throughout the entire disclosure.

Figure 3:
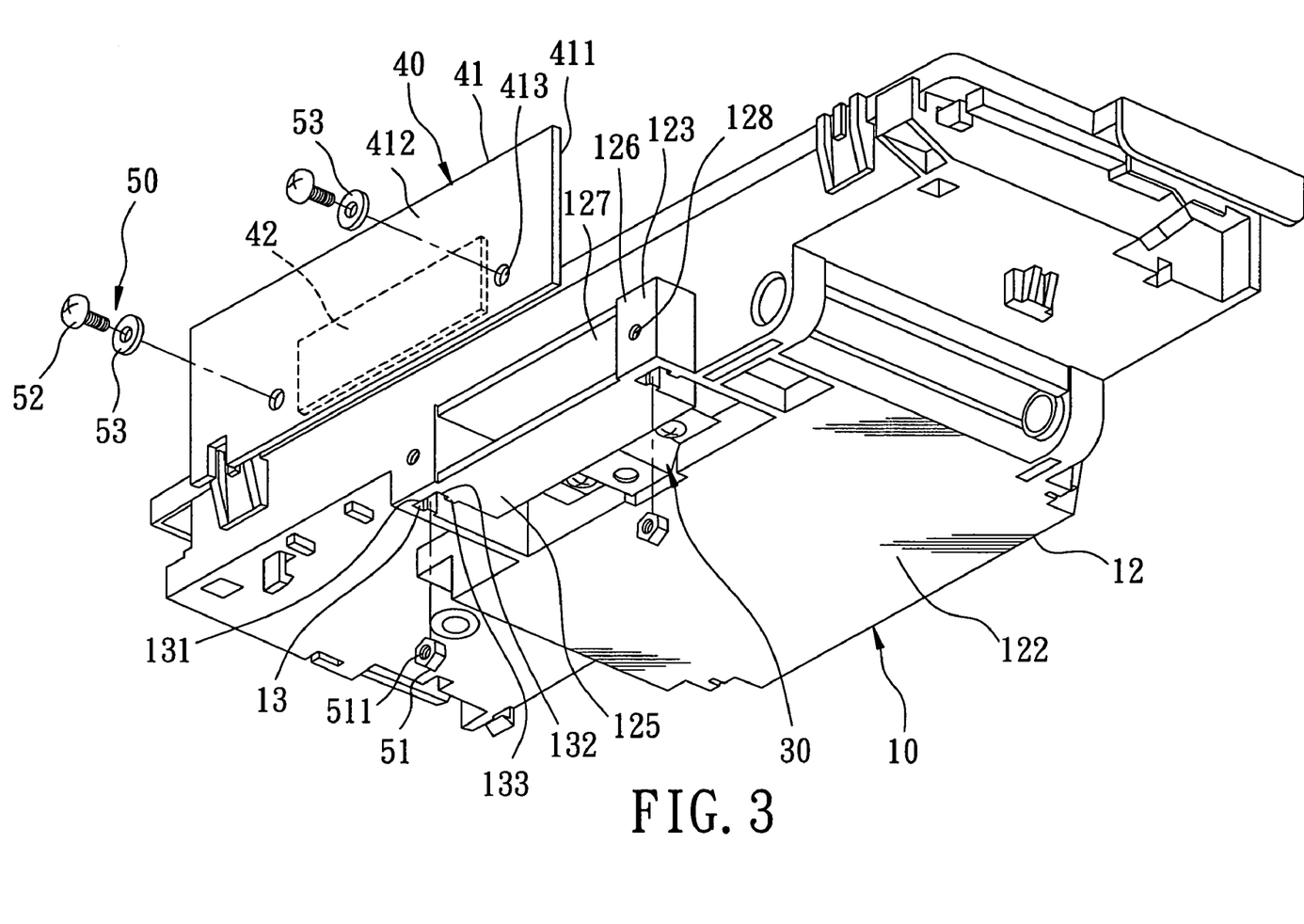
FIG. 3 is an exploded bottom perspective view of the first preferred embodiment of a scanning device according to this invention.
Figure 4:
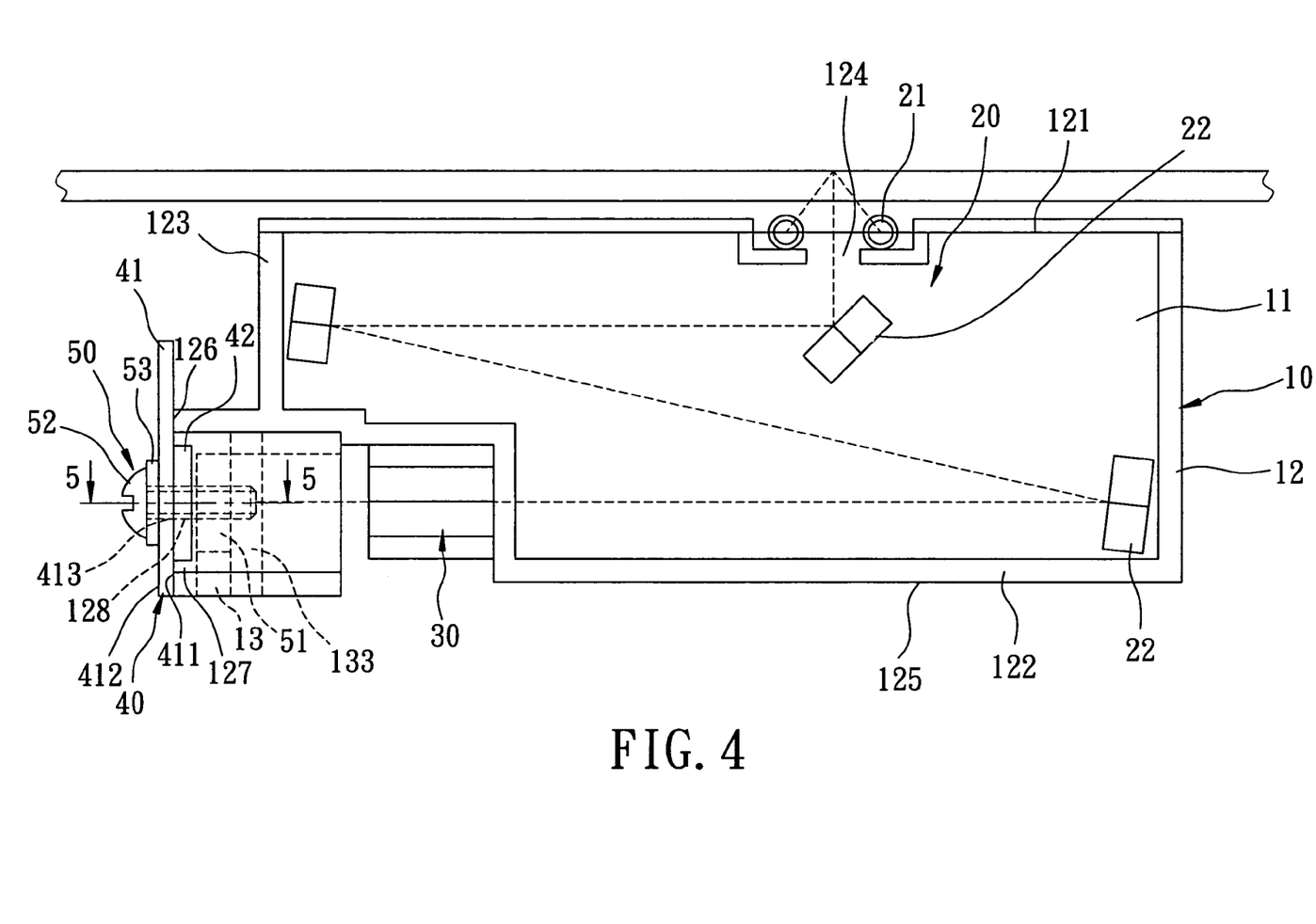
FIG. 4 is a schematic view of the first preferred embodiment.
Figure 7:
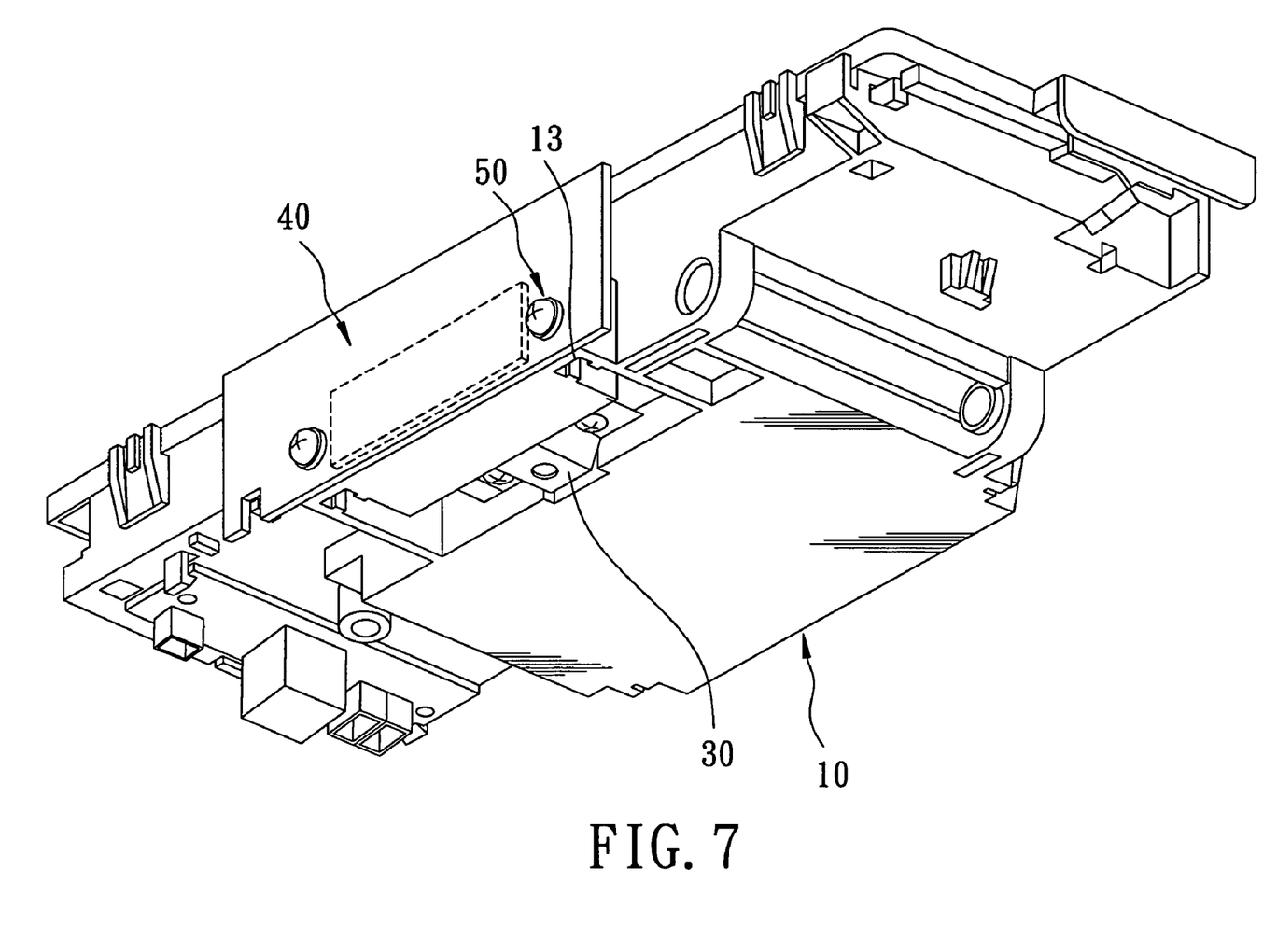
FIG. 7 is an assembled bottom perspective view of the first preferred embodiment of a scanning device according to this invention.

Referring to FIGS. 3, 4, and 7, the first preferred embodiment of a scanning device according to this invention includes a scanner body 10, a scanning unit 20 disposed in the scanner body 10, a lens unit 30 disposed in the scanner body 10, a sensing unit 40 disposed on the scanner body 10, and a fastening unit 50 for fastening the sensing unit 40 to the scanner body 10.

The scanner body 10 includes a housing wall 12 defining a space 11 therein. The housing wall 12 has a top plate 121, a bottom plate 122 opposite to the top plate 121, and a surrounding plate 123 interconnecting the top and bottom plates 121, 122 so as to define a space 11 thereamong. The top plate 121 is formed with a first opening 124. The bottom plate 122 has a bottom surface 125 formed with two slots 13. The surrounding plate 123 has a positioning surface unit 126, and a second opening 127 formed in the positioning surface unit 126 and communicated with the space 11 in the scanner body 10, and two through holes 128 communicated respectively with the slots 13 in the scanner body 10. The second opening 127 is adjacent to the bottom surface 125 of the bottom plate 122, and is disposed between the through holes 128.

Figure 5:
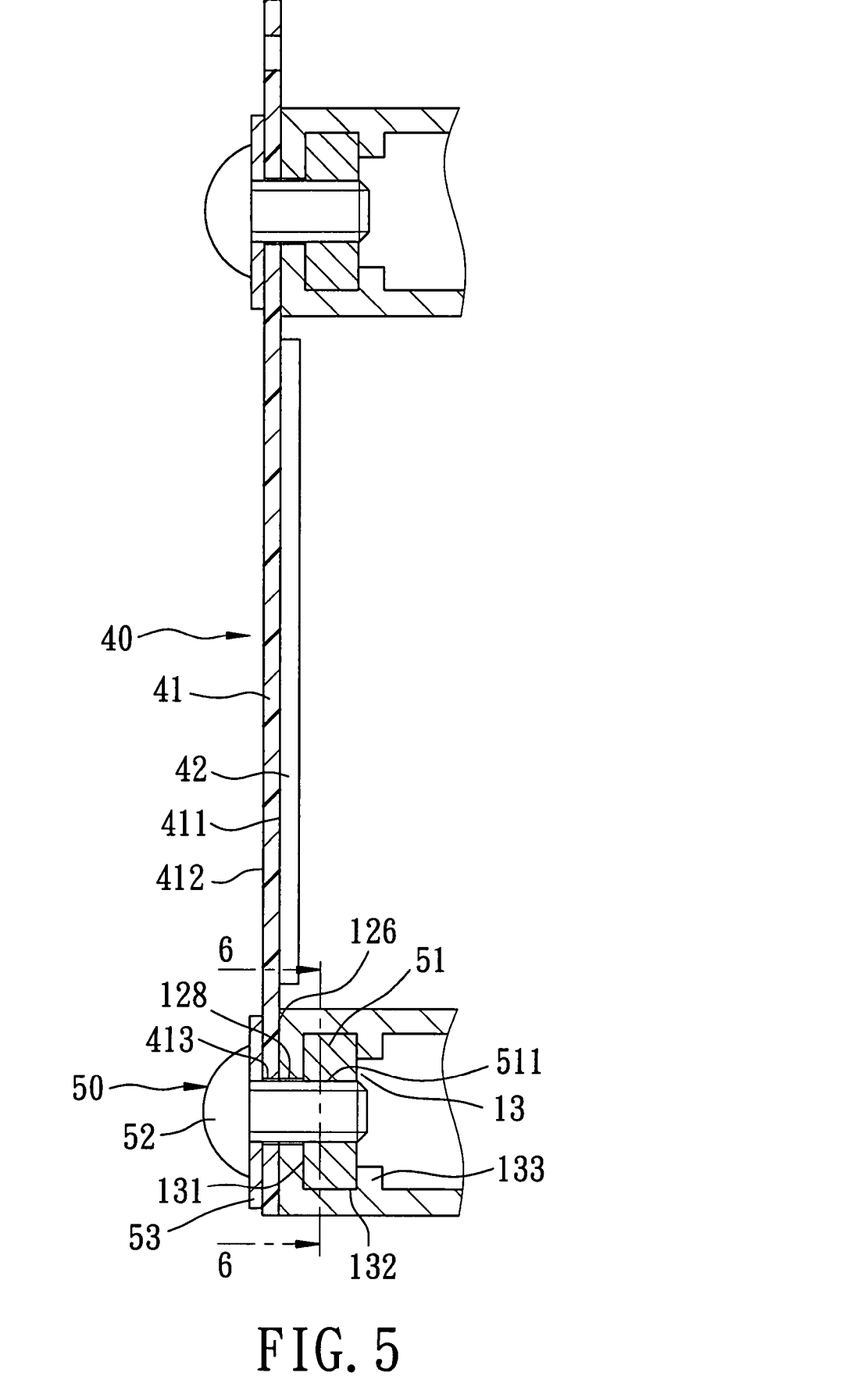
FIG. 5 is a sectional view taken along Line 5-5 in FIG. 4.
Figure 6:
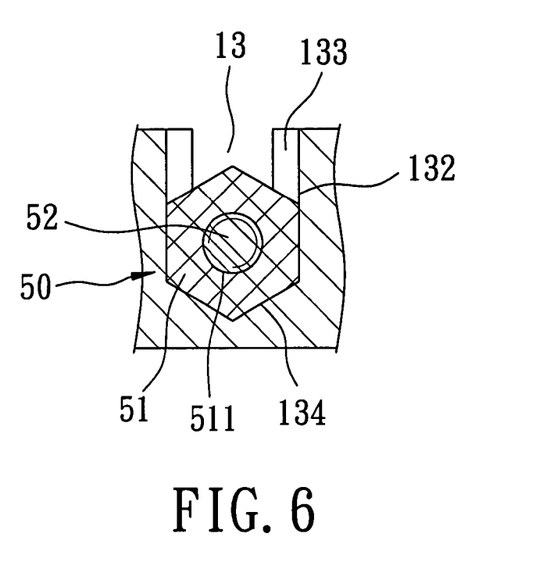
FIG. 6 is a sectional view taken along Line 6-6 in FIG. 5.

With further reference to FIGS. 5 and 6, each of the slots 13 is defined by a slot end surface 131 internal to the positioning surface unit 126, two slot side surfaces 132 extending respectively from two opposite sides of the slot end surface 131, two stop ribs 133 extending respectively from the slot side surfaces 132 toward each other and spaced apart from each other and from the slot end surface 131, and a slot bottom surface 134. In this embodiment, the slot bottom surface 134 is V-shaped.

The scanning unit 20 includes two light-emitting members 21 disposed within the first opening 124, and a plurality of reflectors 22 disposed fixedly in the space 11 for reflecting light beams emitting from the light-emitting members 21.

The lens unit 30 is internal to the second opening 127 for receiving reflected light beams from said reflectors 22, and for focusing the light beams into corresponding optical signals.

The sensing unit 40 is aligned with the lens unit 30, and includes a circuit board 41 attached to the positioning surface unit 126 for covering the second opening 127 in the scanner body 10, and a sensor 42 disposed fixedly on the circuit board 41. The circuit board 41 has an inner side surface 411 abutting against the positioning surface unit 126, an outer side surface 412 opposite to the inner side surface 411, and a pair of through holes 413 extending from the inner side surface 411 to the outer side surface 412. The sensor 42 may be a charge coupled device (CCD) image sensor or a complimentary oxide semiconductor (CMOS) image sensor for receiving optical signals from the lens unit 30 and outputting analog signals corresponding to the optical signals. In this embodiment, the sensor 42 is disposed fixedly on the inner side surface 411 of the circuit board 41, and is aligned with the lens unit 30.

The fastening unit 50 includes two first fastening members 51 disposed respectively within the slots 13 in the scanner body 10, two second fastening members 52 extending respectively through the through holes 413 in the circuit board 41, and two washers 53. In this embodiment, each of the first fastening members 51 is disposed between the ribs 133 and the slot end surface 131 that define the corresponding slot 13, and is configured as a nut having two parallel sides abutting respectively against the slot side surfaces 132 defining the corresponding slot 13. Thus, rotation of the first fastening members 51 within the slots 13 can be prevented. Each of the first fastening members 51 is formed with a threaded hole 511 aligned with the corresponding through hole 413 in the circuit board 41. Each of the second fastening members 52 is configured as a bolt, and extends through the corresponding through hole 413 in the circuit board 41 and the corresponding through hole 128 in the surrounding plate 123. As such, the circuit board 41 is fastened to the housing wall 12.

During assembly, the first fastening members 51 are placed respectively into the slots 13. When the first fastening members 51 come into contact with the slot bottom surfaces 134, respectively, the threaded holes 511 in the first fastening members 51 are aligned respectively with the through holes 128 in the surrounding plate 123. Subsequently, each of the second fastening members 52 is passed in turn through the corresponding washer 53, the corresponding through hole 413 in the circuit board 41, and the corresponding through hole 128 in the surrounding plate 123 to engage the threaded hole 511 in the corresponding first fastening member 51, thereby moving the inner side surface 411 of the circuit board 41 into contact with the positioning surface unit 126 and moving the corresponding washer 53 into contact with the circuit board 41.

The scanning device of this invention has the following advantages:

(1) Since the first fastening members 51 do not project from the positioning surface unit 126, and since each of the first fastening members 51 can be placed easily into the corresponding slot 13 so as to align the threaded hole 511 of the corresponding first fastening member 51 with the second fastening member 52, alignment of the sensor 42 with the lens unit 30 can be ensured, thereby improving the scanning effect of the scanning device.

(2) When stripping of the first and second fastening members 51, 52 occurs due to improper operation, the first and second fastening members 51, 52 maybe easily and inexpensively replaced.

Figure 8:
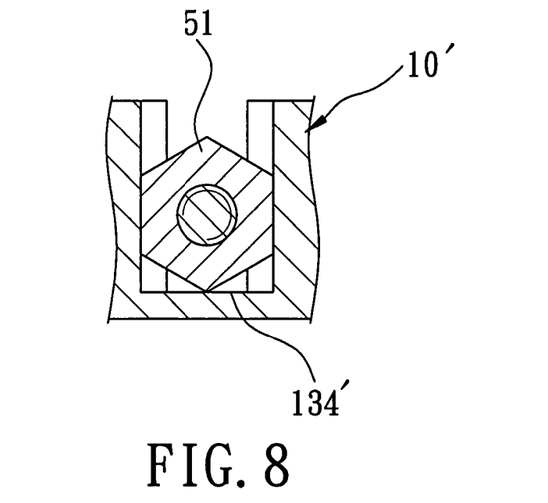
FIG. 8 is a fragmentary sectional view of the second preferred embodiment of a scanning device according to this invention, illustrating a modified slot bottom surface.

FIG. 8 shows a modified slot bottom surface 134' of the scanner body 10'. The modified slot bottom surface 134' is flat, and in contact with a lower corner of the corresponding first fastening member 51.

With this invention thus explained, it is apparent that numerous modifications and variations can be made without departing from the scope and spirit of this invention. It is therefore intended that this invention be limited only as indicated by the appended claims.

We claim:

1. A scanning device comprising:
a scanner body including a housing wall defining a space therein, said housing wall having a first opening, a second opening, a bottom surface adjacent to said second opening, and two slots formed in said bottom surface;
a scanning unit including at least one light-emitting member disposed within said first opening, and at least one reflector disposed fixedly in said space for reflecting light beams emitted from said light-emitting member;
a lens unit disposed in said scanner body for receiving reflected light beams from said reflector and operable to focus light beams into corresponding optical signals;
a sensing unit including a circuit board attached to said scanner body for covering said second opening in said scanner body, and a sensor disposed on said circuit board for receiving said optical signals from said lens unit and outputting analog signals corresponding to said optical signals; and
a fastening unit including two first fastening members disposed respectively within said slots in said scanner body, and two second fastening members connected to said circuit board and engaging respectively and threadably said fist fastening members so as to fasten said circuit board to said housing wall.

2. The scanning device as claimed in claim 1, wherein said housing wall of said scanner body includes a top plate, a bottom plate opposite to said top plate, and a surrounding plate interconnecting said top and bottom plates so as to define said space thereamong, said top plate being formed with said first opening, said bottom plate having said bottom surface, said surrounding plate having a positioning surface unit, a second opening communicated with said space in said scanner body, and two through holes communicated respectively with said slots in said scanner body and aligned respectively with said first fastening members.

3. The scanning device as claimed in claim 2, wherein each of said slots in said bottom surface of said scanner body is defined by a slot end surface internal to said positioning surface unit, two slot side surfaces extending respectively from two opposite sides of said slot end surface, two stop ribs extending respectively from said slot side surfaces toward each other and spaced apart from each other and from said slot end surface, and a slot bottom surface;

each of said first fastening members is disposed between said slot end surface and said ribs that define a corresponding one of said slots, and is configured as a nut having two parallel sides abutting respectively against said slot side surfaces defining the corresponding one of said slots; and each of said second fastening members is configured as a bolt, and extends through said circuit board and a corresponding one of said through holes in said surrounding plate of said scanner body.

4. The scanning device as claimed in claim 3, wherein said slot bottom surface is V-shaped.

5. The scanning device as claimed in claim 3, wherein said slot bottom surface is flat.

6. The scanning device as claimed in claim 3, wherein said fastening unit further includes two washers, said second fastening members extending respectively through said washers such that said washers abut against said circuit board.

* * * * *